United States Patent
Fukushima et al.

(10) Patent No.: US 6,568,272 B2
(45) Date of Patent: May 27, 2003

(54) SUPPORTING APPARATUS AND A VIBRATION GENERATOR

(75) Inventors: Takehiro Fukushima, Itami (JP); Masakazu Shirahoshi, Itami (JP); Kiyoshi Yamamoto, Itami (JP); Katsuhiko Nakamura, Itami (JP)

(73) Assignee: IMV Corporation, Osaka (JP)

( * ) Notice: Subject to any disclaimer, the term of this patent is extended or adjusted under 35 U.S.C. 154(b) by 0 days.

(21) Appl. No.: 09/859,726

(22) Filed: May 18, 2001

(65) Prior Publication Data

US 2002/0026834 A1 Mar. 7, 2002

(51) Int. Cl.$^7$ .............................. B06B 3/00; G01M 7/02
(52) U.S. Cl. ................................................. 73/663
(58) Field of Search ................ 73/662, 663, 666, 73/667, 668, 672

(56) References Cited

U.S. PATENT DOCUMENTS

| | | | | |
|---|---|---|---|---|
| 4,270,390 A | * | 6/1981 | Kimball et al. | ................ 73/663 |
| 4,422,334 A | * | 12/1983 | Yasuda | ................ 403/57 |
| 4,567,772 A | * | 2/1986 | Hudson et al. | ................ 73/663 |
| 4,620,447 A | * | 11/1986 | Kimball | ................ 403/364 |
| 4,776,217 A | * | 10/1988 | Nolan | ................ 384/125 |
| 5,024,096 A | * | 6/1991 | Gregory et al. | ................ 73/662 |
| 5,445,030 A | * | 8/1995 | Hagen | ................ 73/662 |
| 6,389,900 B1 | * | 5/2002 | Leist et al. | ................ 73/662 |

\* cited by examiner

*Primary Examiner*—Hezron Williams
*Assistant Examiner*—Rose M. Miller
(74) *Attorney, Agent, or Firm*—Armstrong, Westerman & Hattori, LLP.

(57) ABSTRACT

The supporting apparatus is disposed between a fixed portion and a moving portion facing the fixed portion at a predetermined distance, and supports the moving portion which vibrates while maintaining parallelism to the fixed portion. The moving portion and the fixed portion are respectively provided with receiving members 2F, 2M facing each other. The receiving members 2F, 2M sandwich, under pressure, a rocking member 4 which limits a movement of the moving portion in crosswise directions Y vertical to vibrating directions R of the moving portion while rocking about Its axis accompanying the vibration of the moving portion in the vibrating directions (R).

7 Claims, 11 Drawing Sheets

SUPPORTING APPARATUS AND A VIBRATION GENERATOR

TECHNICAL FIELD

The present invention relates to a supporting apparatus and a vibration generator utilizing the same, suitably used for supporting a moving portion which reciprocates in predetermined vibrating directions, such as a vibrating table in a vibration generator.

PRIOR ART

In a vibration generator, it is important to prevent a so-called cross vibration, and to reciprocate a vibrating table, which serves as a moving portion, along a predetermined single axis (vibrating directions). The term cross vibration means that the vibrating table moves crosswise, in directions vertical to the predetermined directions (hereinafter, the crosswise directions ray also be called radial directions). In order to prevent the cross vibration, the vibration generator uses a supporting apparatus provided between the vibrating table and a fixed portion provided by such equipment as an exciting machine disposed around the vibrating table. The supporting apparatus guides the vibrating table in the vibrating directions, and limits the movement of the vibrating table in the radial directions.

Figure 11:
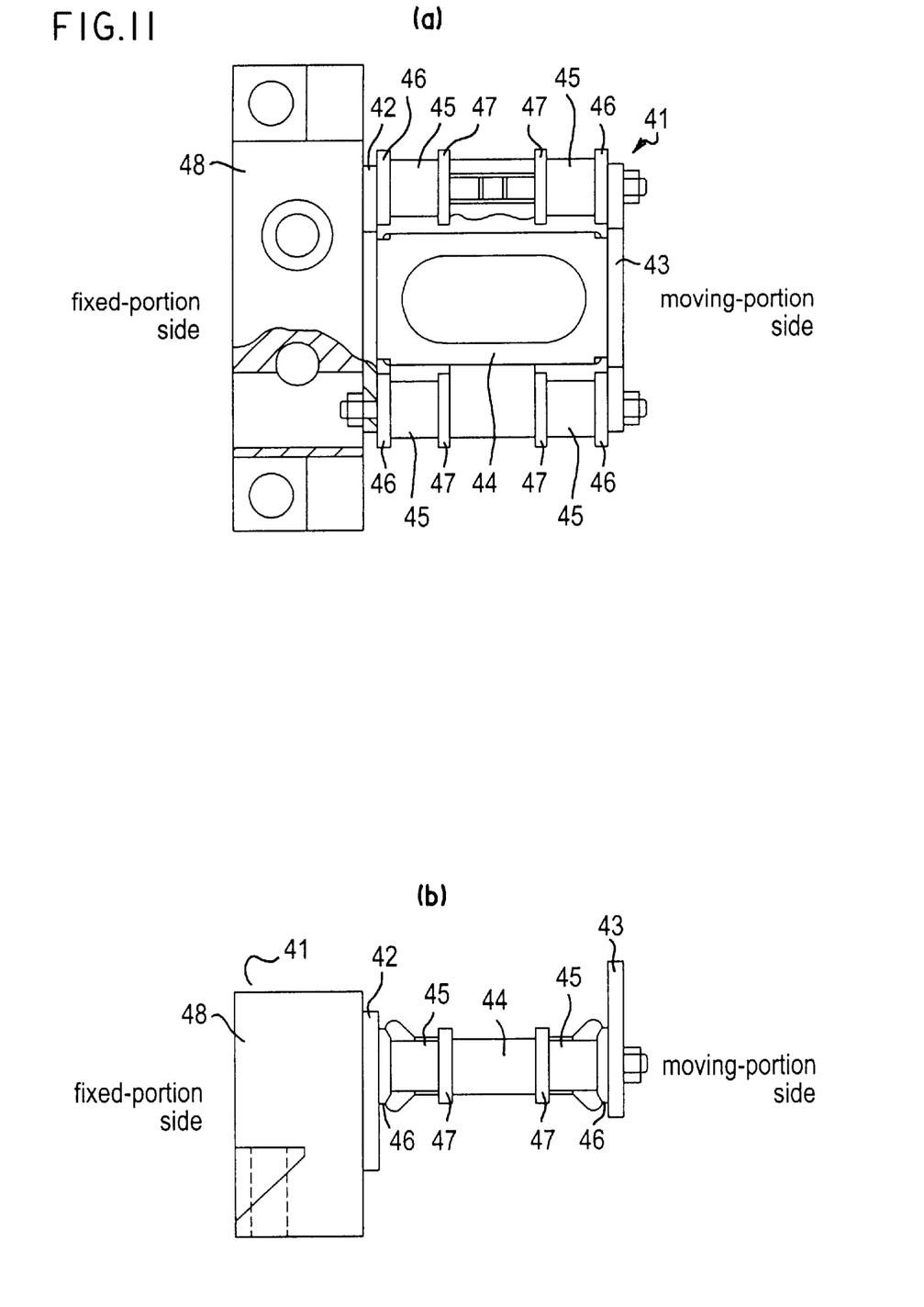
FIG. 11 shows a constitution of a prior art supporting apparatus, with diagram (a) being a plan view and diagram (b) being a front view.

FIG. 11 shows a constitution of a prior art supporting apparatus 41, with diagram (a) being a plan view showing with partial cutout, and diagram (b) being a side view. The supporting apparatus 41 is constituted by sandwiching a rocker 44 between a fixed-side receiver plate 42 attached to the fixed portion and a moving-side receiver plate 43 attached to the vibrating table serving as a moving portion, and by connecting the rocker 44 with the fixed-side receiver plate 42 and the moving-side receiver plate 43 with four connecting members 45. The rocker 44 is rigid in the radial directions, and has arcuate surfaces respectively facing the receiver plates 42, 43. Each of the arcuate surfaces represents a part of the outer circumferential surface of a column assumed on a diameter as being the distance between the receiver plates 42, 43. Each of the connecting members 45 is formed of an elastic member such as rubber, or a synthetic resin such as nylon, polypropylene and so on, and is pressed between a sandwiching plate 46 provided on the receiver plates 42, 43 and another sandwiching plate 47 provided on the rocker 44. With the arrangement described above, the fixed-side receiver plate 42 is attached to a fixed block 48 fastened to the fixed portion.

According to the supporting apparatus 41, the vibrating table can move in vibrating directions because the connecting members 45 undergo deformation, Due to the movement of the vibrating table, the rocker 44 also moves accompanying the deformation of the connecting members 45, while the arcuate surfaces of the rocker 44 keep contact with the respective receiver plates 42, 43. With this constitution, the movement of the vibrating table in the radial directions is limited by the rocker 44.

According to the supporting apparatus 41 described above, since the fixed portion and the vibrating table are interconnected by the connecting members 45, there Is a problem that the connecting portions are subjected to repeated stress, which makes the connecting portions susceptible to fatigue fracture, and makes difficult to improve durability.

Further, a moving range of the vibrating table is limited within a range of deformation of the connecting members 41. Thus, in order to increase the moving range of the vibrating table, the size of the supporting apparatus 45 must be increased, which leads to a problem of increased cost.

Further, if the size of the supporting apparatus 41 is increased, a mass of the moving portion increases, which decreases acceleration to the vibrating table, and makes impossible to generate a vibration having a desired vibration waveform, resulting in decreased reliability of the vibration generator.

The present invention is made in order to solve the above described shortcomings in the prior art, and it is therefore an object of the present invention to provide a supporting apparatus which can be manufactured at a reduced cost while having an increased durability. Another object of the present invention is to provide a supporting apparatus capable of generating a vibration having a desired vibration waveform, thereby increasing the reliability.

DISCLOSURE OF THE INVENTION

A supporting apparatus according to claim 1 is a supporting apparatus disposed between a fixed portion and a moving portion facing the fixed portion at a predetermined distance, for supporting the moving portion which vibrates while maintaining parallelism to the fixed portion, and is characterized In that the moving portion and the fixed portion are respectively provided with receiving members 2F, 2M facing each other; and the receiving members 2F, 2M sandwich, under pressure, a rocking member 4 which limits a movement of the moving portion in crosswise directions Y vertical to vibrating directions R of the moving portion, while rocking about its axis accompanying the vibration of the moving portion in the vibrating directions R.

According to the supporting apparatus provided by claim 1, when the moving portion moves In the predetermined vibrating directions R, the moving-side receiving member 2M also moves, and the rocking member held under pressure between the receiving members 2F, 2M rocks about its axis, making possible to follow the movement of the moving portion. In this case, the rocking member 4 limits the movement of the moving portion in the crosswise directions Y vertical to the vibrating directions R. In other words, the moving portion moves (vibrates) with respect to the fixed portion only in the rocking directions R, and the crosswise movement is prevented. In addition, since the rocking member 4 can be assembled by sandwiching the rocking member between the pair of receiving members 2F, 2M, assembling operation as of the entire apparatus becomes easy. Further, even if the rocking member 4 must be replaced, the replacement can be performed easily.

According to the supporting apparatus provided by claim 1, the cross vibration can be prevented, and the apparatus can be used stably as a supporting apparatus of this kind. Further, since the rocking member should only be sandwiched between a pair of the receiving members, assembling operation of the supporting apparatus becomes easy, and replacement of the rocking member also becomes easy.

A supporting apparatus according to claim 2 is characterized in that the pair of receiving members 2F, 2M each has a flat surface 3 parallel to the vibrating directions R of the moving portion; the rocking member 4 includes a roller portion 4a and an engaging portion 4b; the roller portion 4a has an axis of rotation along the crosswise directions Y; the roller portion 4a has an outer circumferential surface making linear contact with each flat surface 3 of the receiving members 2F, 2M In the crosswise directions Y upon installation of the rocking member 4; and the rocking member 4 is held between the pair of receiving members 2F, 2M by engagement between the engaging portion 4b and the pair of receiving members 2F, 2M during a travel, by rolling, of the roller portion 4a accompanying a reciprocating movement of the moving portion.

According to the supporting apparatus provided by claim 2, the roller portion 4a travels by rolling. It should be noted here that hereinafter, traveling by rolling will be called "rolling". Now, the rolling of the roller portion 4a causes the entire rocking member 4 to travel (rock), However, the engagement between the engaging portion 4b of the rocking portion 4 with the pair of receiving members 2F, 2M keeps the rocking member 4 between the pair of receiving members 2F, 2M. Further, the rolling of the roller portion 4a guides the moving portion in the vibrating directions R, and the outer circumferential surface of the roller portion 4a makes the linear contact with each flat surface 3 of the pair of receiving members 2F, 2M along the crosswise directions Y. Therefore, there is a large friction in the crosswise directions Y, reliably limiting the movement of the moving portion in the crosswise directions Y vertical to the vibrating directions R. Further, the rocking member 4 is held by the receiving members 2F, 2M, and the vibration of the moving portion is stabilized.

According to the supporting apparatus provided by claim 2, since the movement of the moving portion in the crosswise directions (radial directions) vertical to the vibrating directions is limited by the roller portion, the rocking member can have a relatively simple shape. This makes easy to manufacture the rocking member including the roller portion, and makes possible to reduce the cost of manufacture. Further, the movement of the moving portion in the crosswise directions vertical to the vibrating directions is reliably limited, resulting in a superb performance as a supporting apparatus of this kind. Further, since the roller portion does not move in the crosswise directions, the roller portion is less susceptible to wear and chipping, making possible to improve durability.

A supporting apparatus according to claim 3 is characterized in that the engaging portion 4b includes a pair of first and second engaging members 8a, 8b each having arcuate engaging surfaces C, C respectively on a side facing the fixed portion and on a side facing the moving portion, in symmetry with respect to the axis of rotation; the first and the second engaging portions 8a, 8b are disposed side by side, on the axis of rotation, in a mutually inverted relationship; each of the receiving members 2F, 2M is provided with a pair of slanted surfaces slanting at a same angle but in opposite directions; the mutually-facing slanted surfaces 16, 17 are slanted in a same direction; each of the first and the second engaging members 8a, 8b is disposed between the receiving members 2F, 2M, with respective engaging surfaces (C) . . . contacting a corresponding one of the slanted surfaces 16, 17; and the engaging surfaces of the engaging portion 4b and the slanted surfaces of the receiving members 2 keep contact during the travel, by rolling, of the roller portion 4a accompanying the reciprocating movement of the moving portion.

According to the supporting apparatus provided by claim 3, the first and the second engaging members 8a, 8b are disposed between the receiving members 2F, 2M, the engaging surfaces of the first and the second engaging members 8a, 8b are disposed on the fixed side and on the moving side respectively, In symmetry with respect to the axis of rotation, and the first and the second engaging members 8a, 8b are disposed in a mutually inverted relationship. Therefore, disengaging directions for the first and the second engaging members 8a, 8b to come out of the pair of receiving members 2F, 2M are different from each other. With this arrangement, even if the moving portion travels (vibrates) with respect to the fixed portion, the rocking member 4 sandwiched between the pair of receiving members 2F, 2M does not fall off from between the receiving members 2F, 2M.

According to the supporting apparatus provided by claim 3, the rocking member does not fall off even when traveling in the vibrating directions, and is held between the pair of receiving members. Therefore, a stable supporting apparatus is provided.

A supporting apparatus according to claim 4 is characterized in that the rocking member 4 is constituted by connecting the roller portion 4a and the engaging portion 4b each formed individually, and that the first and the second engaging members 8a, 8b of the engaging portion 4b are members having a same shape, According to the supporting apparatus provided by claim 4, the rocking member 4 is constituted by assembling the roller portion 4a and the engaging portion 4b each formed-:individually. Therefore, as compared to the case in which the rocking member 4 is formed integrally, a shape of the parts to be manufactured is simpler, which makes possible to easily manufacture the roller portion 4a and the engaging portion 4b. Further, the engaging portion 4b is constituted by assembling a pair of engaging members 8a, 8a having a same shape. Therefore, as compared to the case in which the engaging portion 4b is formed integrally, a shape of the parts to be manufactured is simpler, and it Is necessary to manufacture only one kind of the engaging member 8. Further, since the engaging member 8 is only one kind, storage and handling of the engaging portion 5 become easy, and an assembling operation becomes simple.

According to the supporting apparatus provided by claim 4, the rocking member is constituted as an assembly of the individually formed roller portion and the engaging portion. Therefore, as compared to the case in which the rocking member is formed integrally, a shape of the parts to be manufactured is simpler. This makes possible to manufacture the roller portion and the engaging portion easily, and to reduce the cost of manufacture. Further, the engaging portion is constituted as an assembly of a pair of engaging members having a same shape. Therefore, as compared to the case in which the engaging portion is formed integrally, a shape of the parts to be manufactured is simpler, and it is necessary to manufacture only one kind of the engaging member, making possible to further reduce the cost of manufacture. Further, since the engaging member is only one kind, storage and handling of the engaging portion become easy, and assembling operation becomes simple.

A supporting apparatus according to claim 5 is characterized in that the fixed-side receiving member 2F and the moving-side receiving member 2M have a same shape, and are disposed in symmetry with respect to the axis of rotation of the rocking member 4.

According to the supporting apparatus provided by claim 5, the pair of receiving members 2F, 2M attached to the fixed portion and the moving portion respectively have an identical shape. Therefore, it is necessary to manufacture only one kind of the receiving member 2. Further, since the receiving member 2 is only one kind, storage and handling of the receiving member 2 become easy, and assembling operation becomes simple.

According to the supporting apparatus provided by claim 5, it is necessary to manufacture only one kind of the receiving member 2, and it is possible to reduce the cost of manufacture. Further, since the receiving member is only one kind, storage and handling of the receiving member 2 become easy, and assembling operation becomes easy.

A supporting apparatus according to claim 6 is characterized in that at least one of the fixed-side receiving member 2F and the moving-side receiving member 2M is provided with a limiting member 6 for limiting an axial movement of the rocking member 4.

According to the supporting apparatus provided by claim 6, the limiting member 6 limits the movement of the rocking member 4 in the axial directions (crosswise directions Y). Therefore, the rocking member 4 can be reliably held between the pair of receiving members 2F, 2M, and thus it is possible to stably support the moving portion.

According to the supporting apparatus provided by claim 6, the rocking member can be reliably held between the pair of receiving members, and the moving portion can be stably supported.

A vibration generator according to claim 7 comprises a vibrating table 32 and a main body 34 including an exiting machine 33 for giving the vibrating table 32 a vibration in directions along a predetermined single axis R. The generator is characterized in that the vibrating table 32 provides a moving portion, the main body 34 providing a fixed portion, a plurality of supporting apparatuses 1 according to one of claims 1–6 being disposed between the main body 34 and the vibrating table 32 for supporting the vibrating table 32.

According to the vibration generator provided by claim 7, the supporting apparatuses 1 prevent movement in the crosswise directions Y vertical to the vibrating directions R, thereby making possible to stably support the vibrating table 32. Therefore, it becomes possible to generate a vibration having a predetermined vibration waveform, and improve reliability as the vibration generator.

According to the vibration generator provided by claim 7, since the vibrating table can be stably supported by the supporting apparatuses, it becomes possible to generate a vibration having a predetermined vibration waveform, and improve reliability as the vibration generator.

BEST MODE FOR CARRYING OUT THE INVENTION

Figure 1:
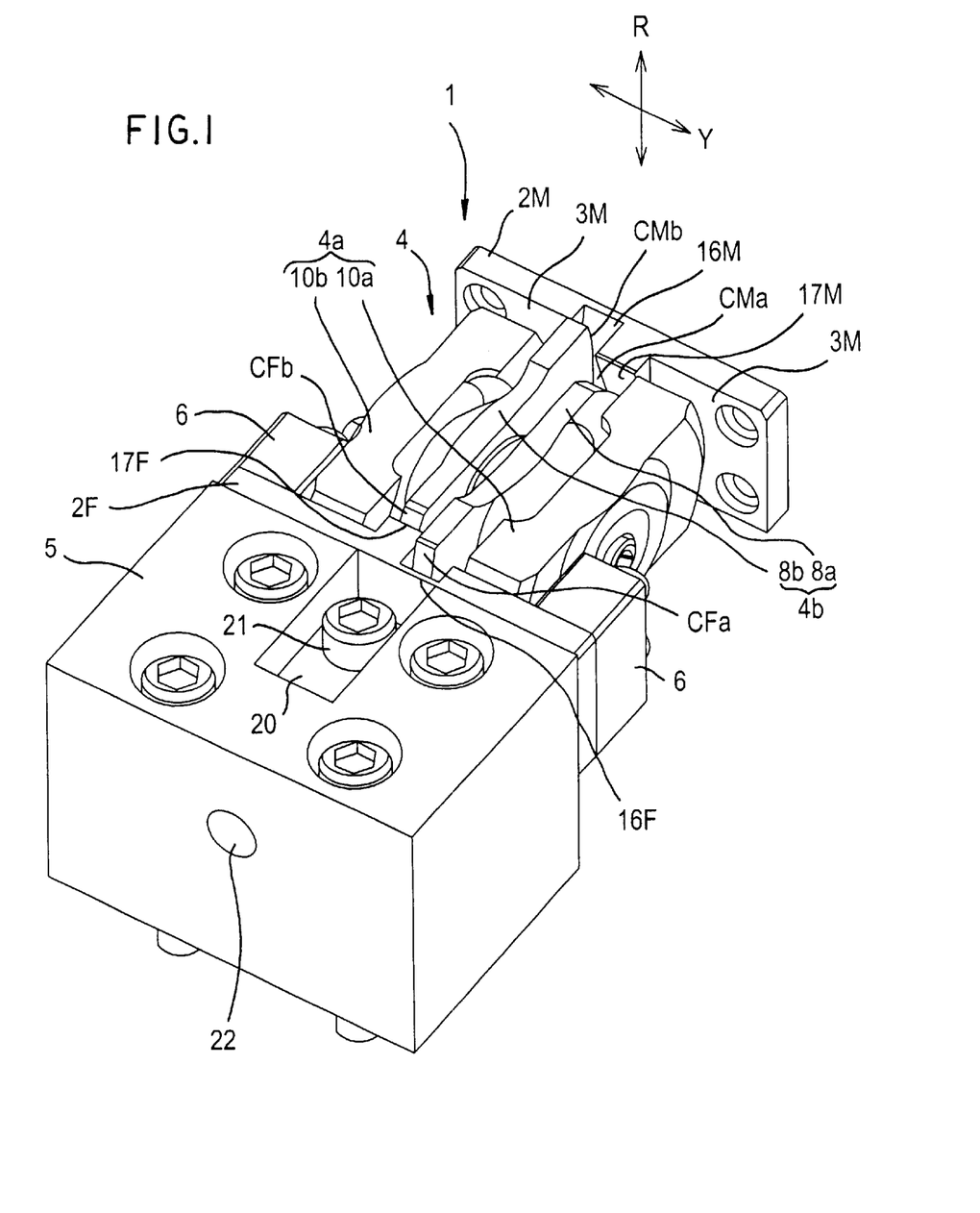
FIG. 1 is a perspective view of a supporting apparatus as an embodiment of the present invention.
Figure 2:
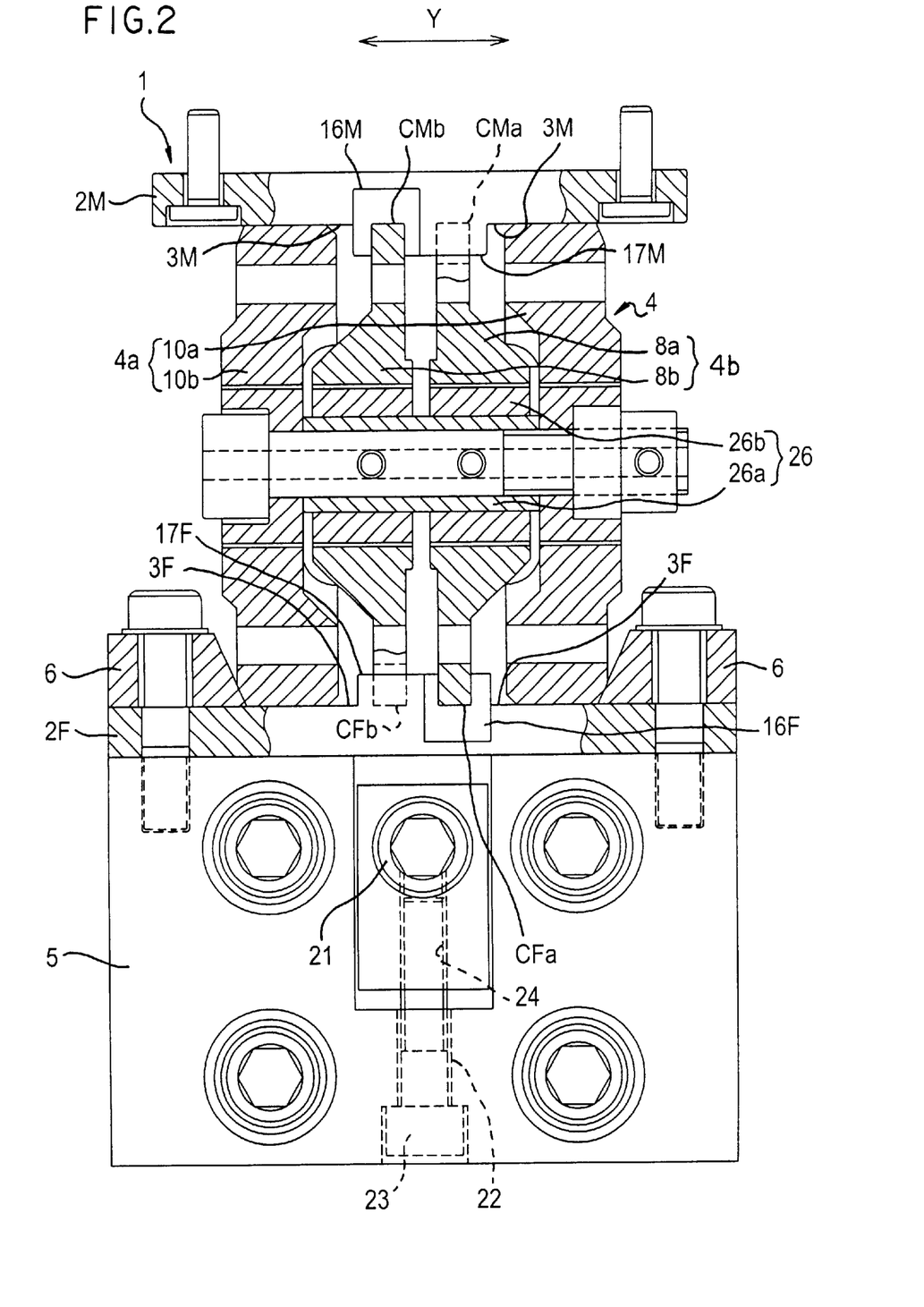
FIG. 2 is a plan view of the supporting apparatus shown with partial cutout.

Next, a specific mode of embodiment for the supporting apparatus and the vibration generator according to the present invention will be described in detail, with reference to the attached drawings. FIG. 1 is a perspective view of a supporting apparatus as an embodiment of the present invention, and FIG. 2 is a plan view of the supporting apparatus 1, shown with partial cutout.

The supporting apparatus 1 is an apparatus to be disposed between a fixed portion and a moving portion faced to the fixed portion at a predetermined distance, for supporting the moving portion which is vibrated while being maintained in parallel to the fixed portion, and for limiting a movement of the moving portion in crosswise directions Y (radial directions) which are directions vertical to vibrating directions R of the moving portion (See FIG. 1 and FIG. 2), The supporting apparatus 1 comprises a pair of receiving members provided by receiver plates 2F, 2M (hereinafter may also indicated collectively by a single-letter code "2") attached respectively to the moving portion and the fixed portion. A rocking member provided by a rocker 4 held under pressure by the pair of receiver plates 2F, 2M, a fixed block 5 fixed to the fixed portion and to which the fixed-side receiver plate 2F is attached, and a pair of limiting members provided by side plates 6, 6 attached to the fixed-side receiver plate 2F. It should be noted here that hereinafter, a member or a component indicated by a numeral code accompanied by a letter F is a member or a component belonging to a constitution on the fixed-portion side. Likewise, that indicated by a numeral code accompanied by a letter M is of the moving-portion side.

The receiver plates 2F, 2M have pairs of flat surfaces 3F, 3F, 3M, 3M respectively, and pairs of slanted surfaces 16F, 17F, 16M, 17M respectively. The flat surfaces 3F, 3F of the fixed-side receiver plate 2F face the flat surfaces 3M, 3M of the moving-side receiver plate 2M. Each of the flat surfaces 3M, 3M is disposed in parallel to the vibrating directions R. On the other hand, the rocker 4 has an engaging portion 4b and a roller portion 4a. The rocker 4 is disposed under pressure, in such way that the roller portion 4a has its axis of rotation laid in parallel to the surfaces 3F, 3M and in the crosswise directions Y vertical to the vibrating directions R, whereas an outer circumferential surface of the roller portion 4a makes a linear contact with the flat surfaces 3F, 3M of the pair of receiver plates 2F, 2M respectively, along the crosswise directions Y. With the above arrangement, the engaging portion 4b of the rocker 4 is engaged with the receiver plates 2F, 2M. According to the supporting apparatus 1, when the roller portion 4a rolls accompanying a reciprocating motion of the moving portion, the engagement of the engaging portion 4b with the pair of receiver plates 2F, 2M holds the rocker 4 between the pair of receiver plates 2F, 2M.

According to the supporting apparatus 1 having the constitution described above, when the moving portion moves in the vibrating directions R, the moving-side receiver plate 2M moves to roll the roller portion 4a, sandwiched under pressure by the pair of receiver plates 2F, 2M, and the entire rocking member 4 rocks. This is because the axis of rotation of the roller portion 4a is not fixed. An amount of displacement of the axis of rotation of the roller portion 4a at this time is ideally a half of an amount of displacement of the moving portion. While rolling on the surfaces 3F, 3M, the roller portion 4a limits freedom of movement of the moving portion in directions other than the vibrating directions R.

On the other hand, the engaging portion 4b rolls along the slanted surfaces 16F, 17F, 16M, 17M of the receiver plates 2F, 2M. It should be noted here that according to the present embodiment, as will be described later, the roller portion 4a and the engaging portion 4b are connected together via an anti-vibration member 26, and for this reason, a rolling angle of the engaging portion 4b is not necessarily equal to a rolling angle of the roller portion 4a. The engaging portion 4b has engaging surfaces CFa, CMa, CFb, CMb (hereinafter may also be indicated collectively by a code "C") are so made that even if the roller portion 4a and the engaging portion 4b roll simultaneously, the axis of rotation of the roller portion 4a and an axis of rotation of the engaging portion 4b are on a same straight line. With this arrangement, since the engaging surfaces CFa, CFb contact the slanted surfaces 16F, 17F respectively, and the engaging surfaces CMa, CMb contact the slanted surfaces 16M, 17M respectively, the roller portion 4a connected with the engaging portion 4b is limited in its movement (sliding movement) other than the rolling movement on the flat surface 3. However, if the roller portion 4a and the engaging portion 4b are connected via the anti-vibration member 26 as mentioned above, the sliding movement of the roller portion 4a is limited within a moving range of the anti-vibration member 26. The rolling movement of the roller portion 4a makes the entire rocker 4 move, but the engagement of the engaging portion 4b of the rocker 4 with the pair of receiver plates 2M, 2F holds the rocker 4 between the pair of receiver plates 2F, 2M. Therefore, because the rolling movement of the roller portion 4a guides the moving portion in the vibrating directions R, and the outer circumferential surface of the roller portion 4a makes linear contact with the flat surfaces 3 of the receiving members 2F, 2M, friction resistance in the crosswise directions Y is large, reliably limiting the movement of the moving portion in the crosswise directions Y vertical to the vibrating direction R.

Figure 3:
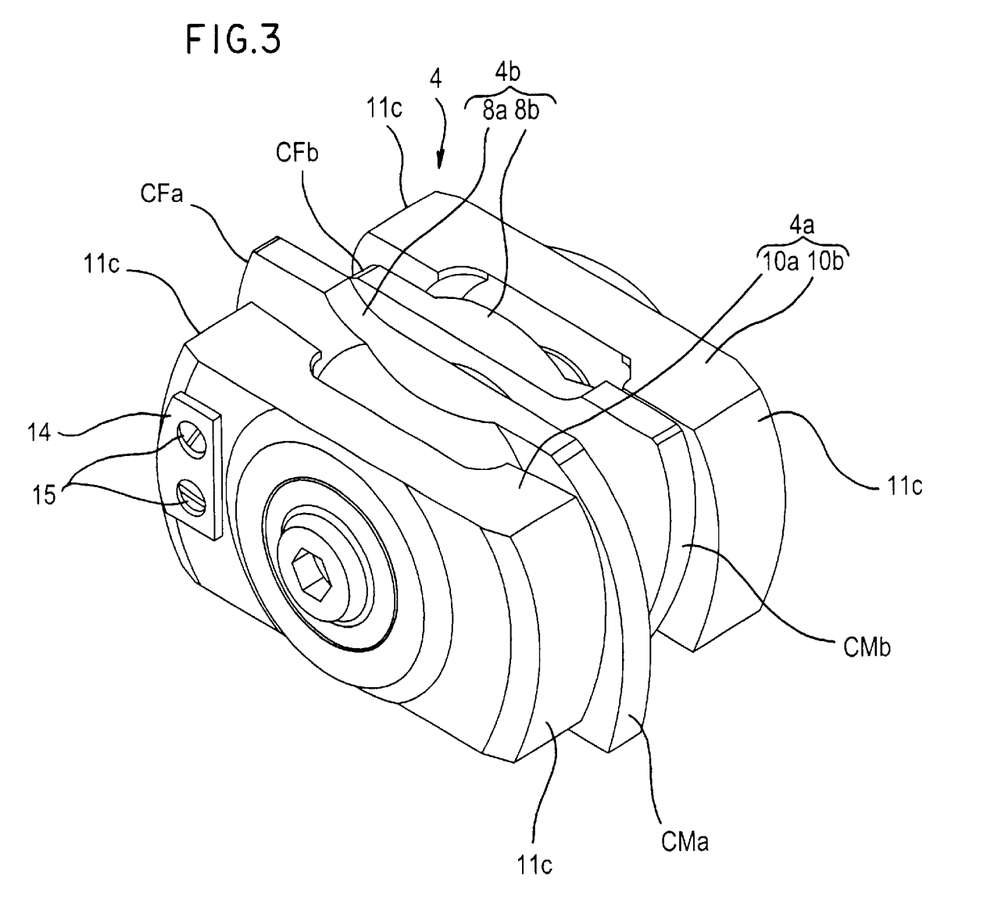
FIG. 3 is a perspective view of a rocker.
Figure 4:
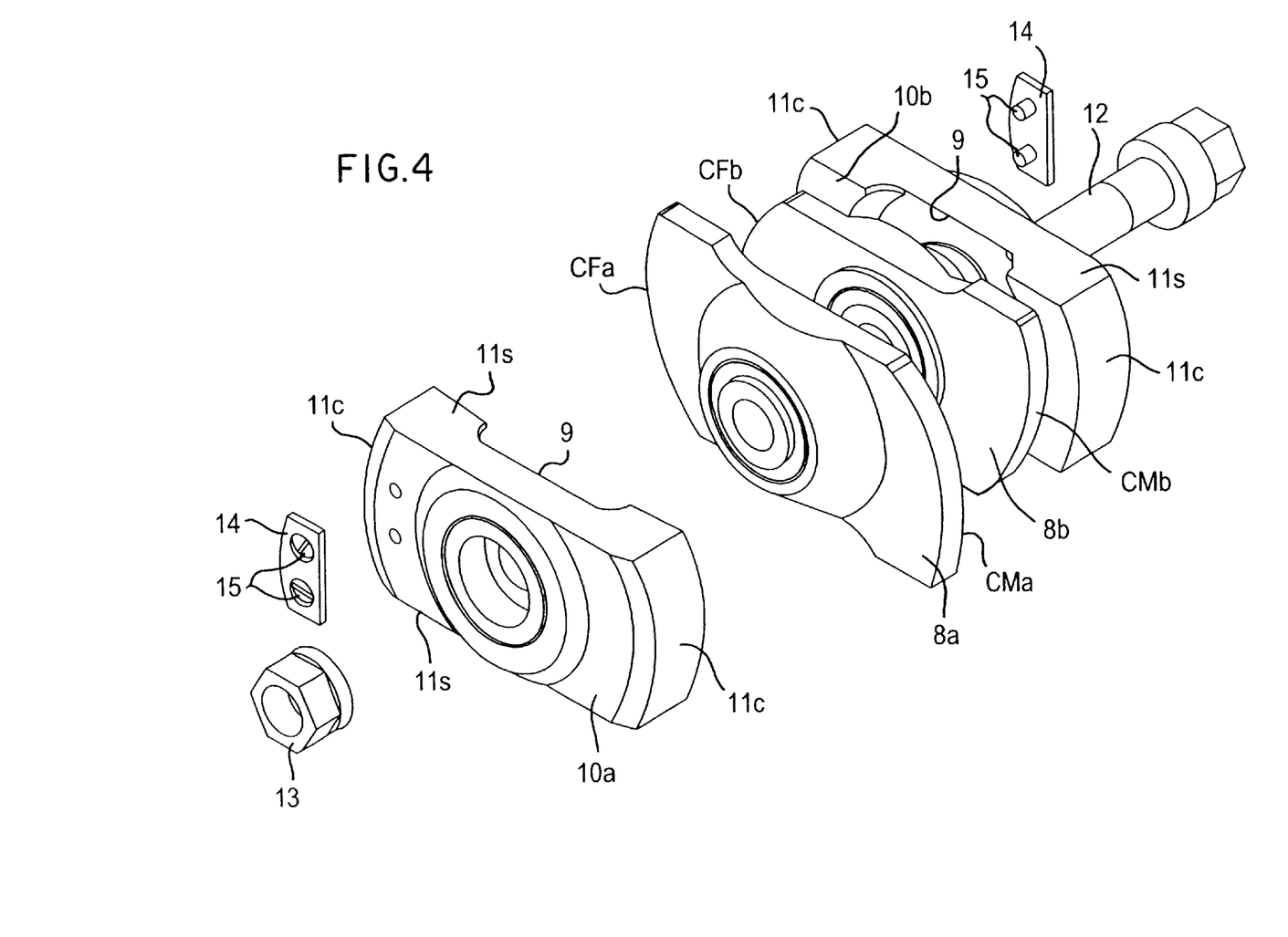
FIG. 4 is an exploded perspective view of the rocker.

Next, constituent parts of the supporting apparatus 1 will be described. FIG. 3 is a perspective view of the rocker 4, and FIG. 4 is an exploded view of the rocker 4. Assembly of the rocker 4 is such that the engaging portion 4b provided by engaging members (cams) 8a, 8b (hereinafter may also indicated collectively by a numeral "8") are sandwiched by the roller portion 4a, i.e. between a pair of roller members 10a, 10b (hereinafter may also indicated collectively by a numeral "10"). Each of the parts has a center formed with a through hole, and a bolt 12 inserted through the holes and threaded by a nut 13 fastens all of the parts together. The cams 8a, 8b are members having an identical shape with each other, and disposed at a predetermined interval in the direction of the axis of rotation, i.e. along the crosswise directions Y, and in a mutually inverted relationship.

The roller portion 10 is a generally rectangular, plate-like member, as will be depicted as a shape obtained by cutting a circular plate of a predetermined outer diameter along a pair of parallel lines spaced equally from the center of the circle. In other words, the outer circumferential surface of the roller member 10 is constituted by a pair of arcuate surfaces 11C, 11C and a pair of straight, parallel surfaces 11S, 11S. Further, the pair of arcuate surfaces 11C, 11C are symmetric to each other with respect to a centerline provided by the axis of rotation, and so are the pair of parallel surfaces 11S, 11S.

Further, each of the roller members 10 has a side portion formed with a recess 9. The recess 9 is fitted by a corresponding one of the cams 8a, 8b. With this arrangement, the roller members 10a, 10b are disposed in such a way that one recess 9 faces the other. Each of the roller members 10 has another side portion, away from the one described above, to which a slip plate 14, 14 is attached by bolts 15, 15 at a portion close to the fixed side. The slip plates 14 slidably contact the side plates 6, 6 shown in FIG. 1, reducing friction and smoothen the movement of the rocker 4.

Figure 5:
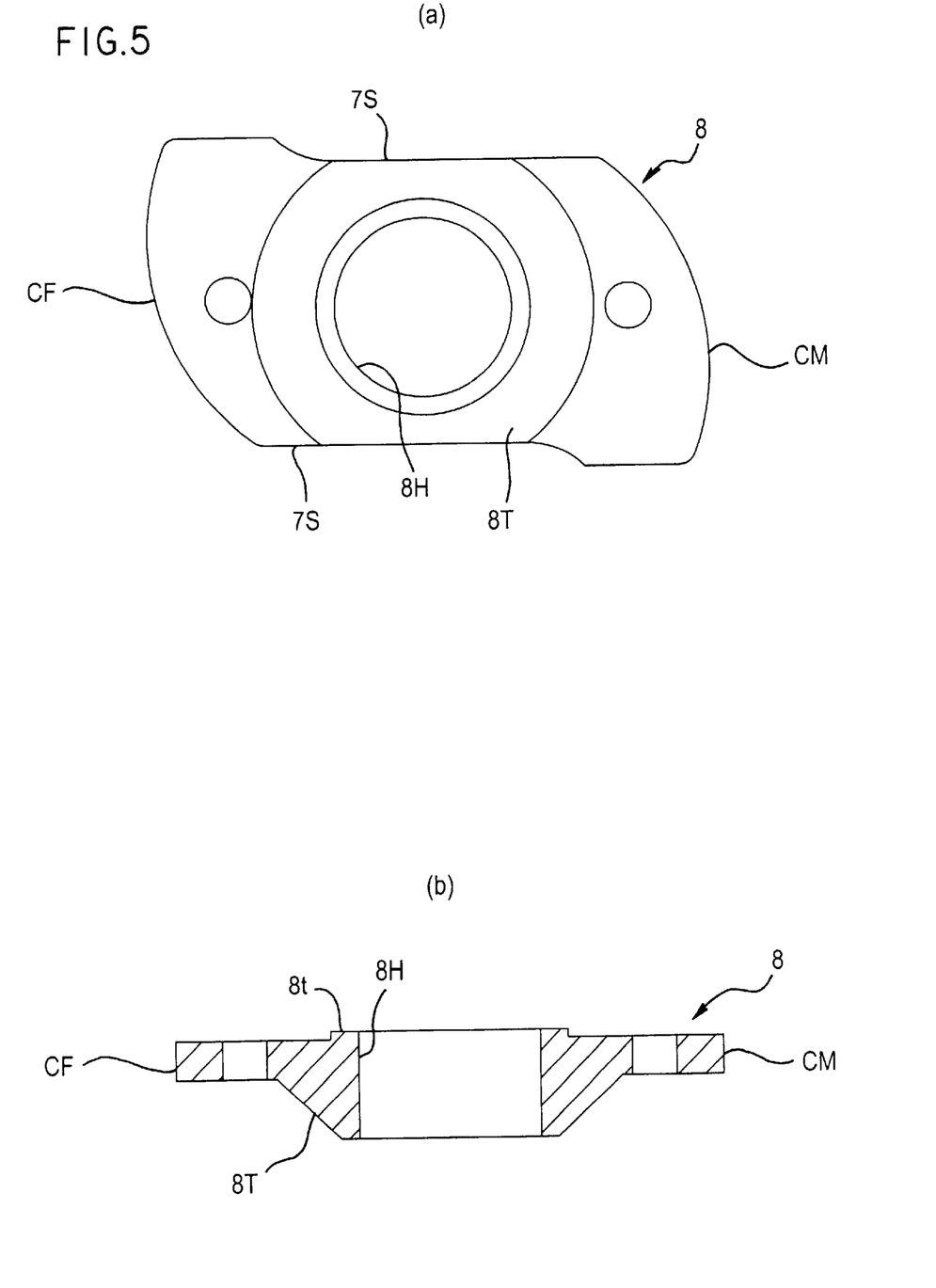
FIG. 5 shows a shape of a cam, with diagram (a) being a side view, and diagram (b) being a sectional view.

The cam 8, like the roller member 10, is a generally rectangular, plate-like member. More specifically, the cam 8 has an outer circumferential surface constituted by a pair of generally arcuate surfaces (engaging surfaces) C, C and a pair of generally straight, parallel surfaces 7S, 7S. Further, the pair of engaging surfaces C, C are symmetric to each other with respect to a centerline, and so are the pair of parallel surfaces 7S, 7S. An accurate shape of the engaging surface C will be described later.

The cam 8 has a center formed with a circular insertion hole 8H. At a time of assembly, a cylindrical anti-vibration member 26 is inserted into the insertion hole 8H (See FIG. 1). The insertion hole 8H shares a same centerline as of the cam 8. The anti-vibration member 26 includes a metal tube 26a having an outer circumferential portion covered by an elastic member 26b made of rubber for example.

Further, the cam 8 has a side portion formed with a projection 8T having a generally frustoconical outline. The projection 8T enhances strength of the cam 8. The cam 8 has another side portion formed with a minor projection 8t having a generally frustoconical outline.

The cams 8a, 8b are disposed in a mutually inverted relationship. Specifically, the cams 8a, 8b are disposed with each minor projection at facing inward to face each other, and with each major projection 8T facing outward. With this arrangement, when assembling the rocker 4, the outward-facing major projections 8T, 8T of the cams 8a, 8b are fitted into corresponding one of the recesses 9a, 9b of the roller members 10a, 10b.

Insertion holes 10H, 10H of the roller members 10a, 10b are aligned with the cylinder 26a of the anti-vibration member 26 inserted into the insertion holes 8H, 8H of the cams 8a, 8b. Then, the roller members 10a, 10b and the cams 8a, 8b are fastened together by the bolt 12 and the nut 13. Because of the connection by the bolt 12 and the cylinder 26a, the roller members 10a, 10b displace integrally with each other. On the other hand, the cam 8a, 8b, which are connected with the roller members 10a, 10b via the elastic member 26b, can make relative displacement with respect to the roller members 10a, 10b within a range of deformation of the elastic member. This absorbs assembling errors, making the cam 8 always contacting the slanted surfaces 16, 17. Further, this also makes possible to reduce the movement (slipping movement) of the cam 8 other than the rolling movement, and to reduce wear of the engaging surface C of the cam 8 and of the slanted surfaces 16, 17.

Figure 6:
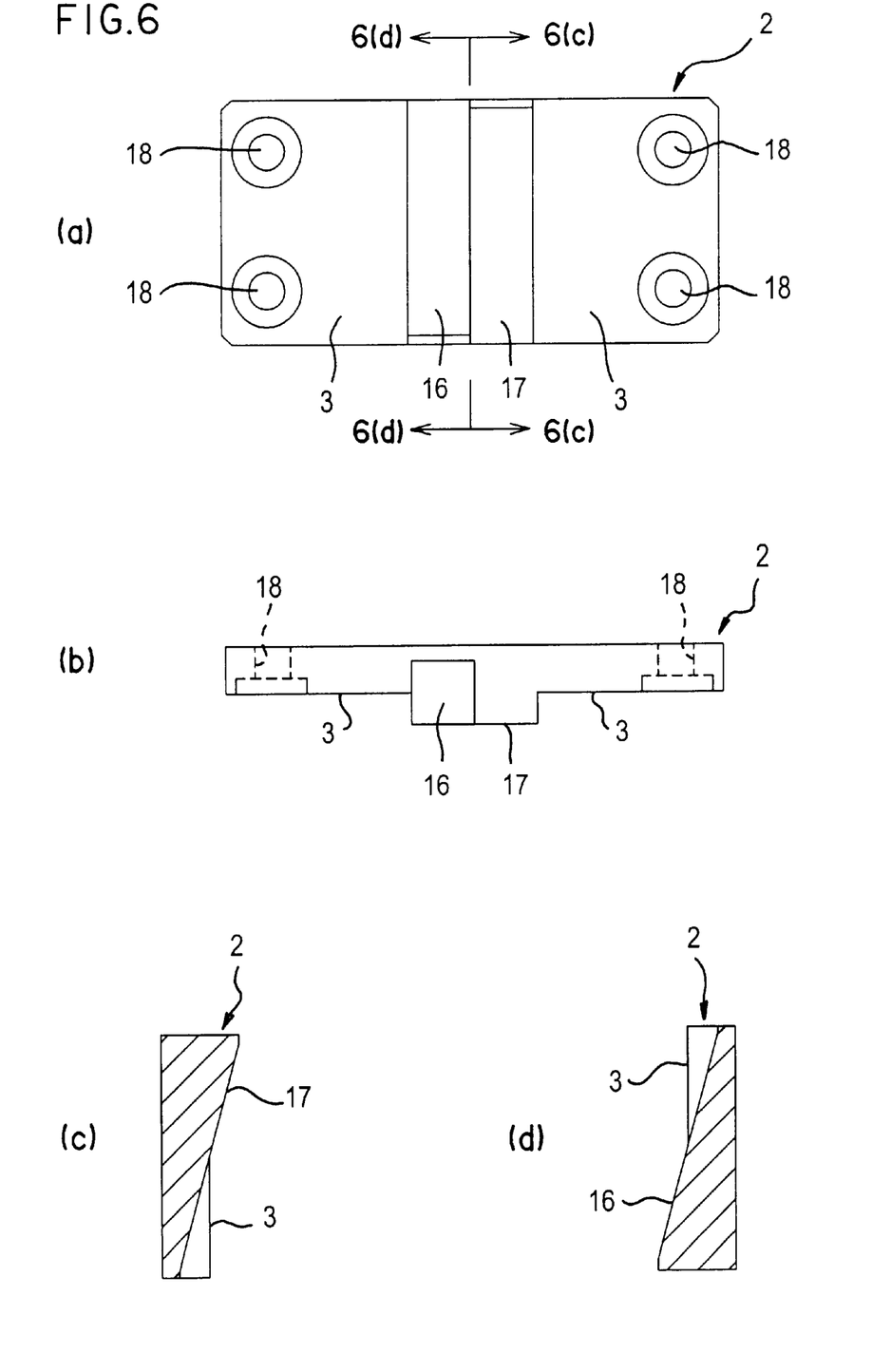
FIG. 6 shows a shape of a receiver plate, with diagram (a) being a front view, diagram (b) being a plan view, diagram (a) being a sectional view taken in line C—C in diagram (a), and diagram (d) being a sectional view taken in line D—D in diagram

FIG. 6 shows a shape of the receiver plate 2. A diagram (a) is a front view, a diagram (b) is a plan view, a diagram (c) is a sectional view taken in a line C—C in the view (a), and a diagram (d) is a sectional view taken in a line D—D in the view (a). The receiver plate 2 is a generally rectangular plate member as shown in FIG. 6(a), and has a generally central portion formed with the pair of slanted surfaces 16, 17. Flat surfaces 3, 3 are formed on a left side of the slanted surface 16 and a right side of the slanted surface 17 respectively. The flat surfaces 3, 3 are on a same plane. Further, the receiver plate 2 has four corner portions each formed with a bolt insertion hole 18.

Figure 7:
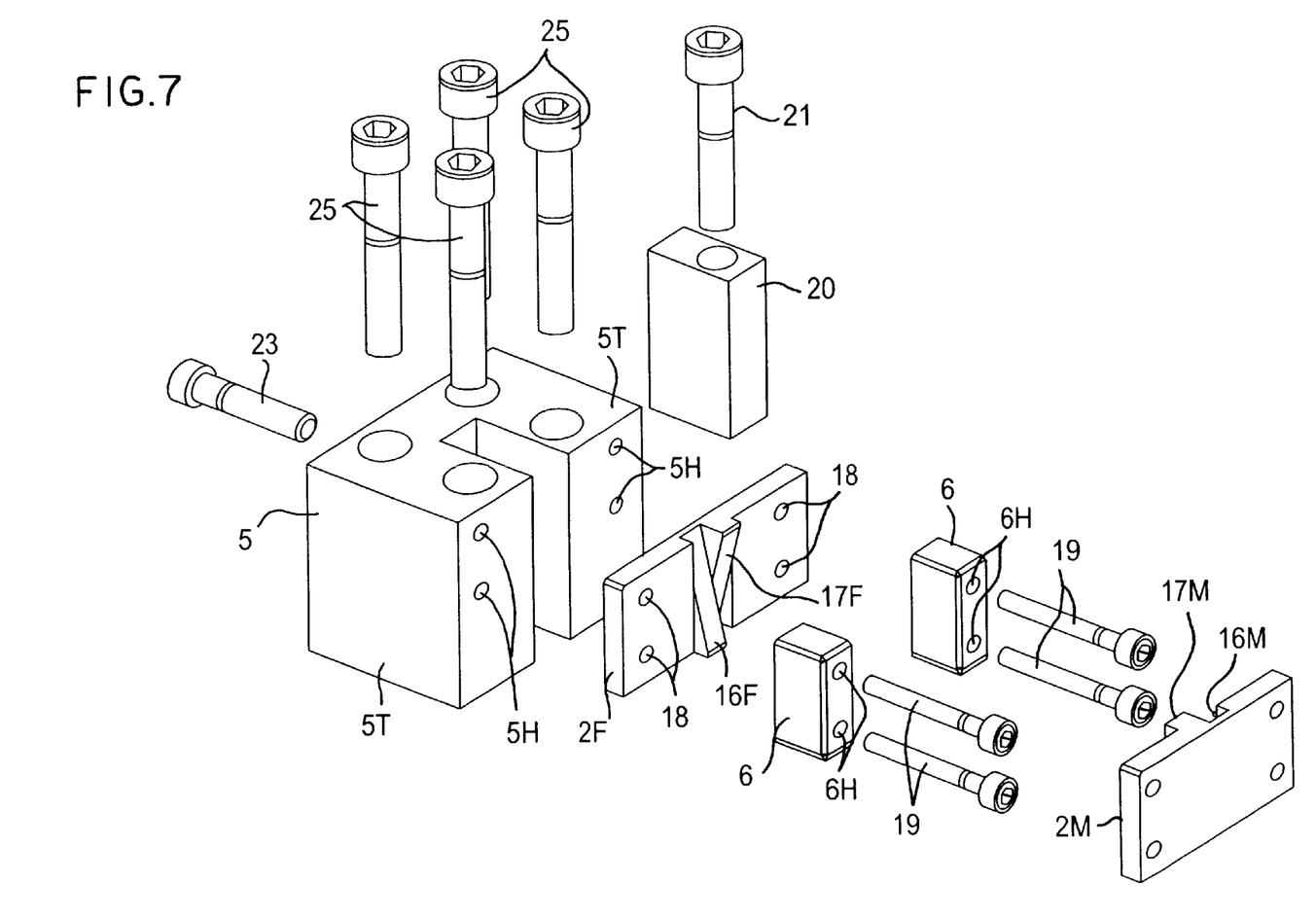
FIG. 7 is an exploded perspective view showing a state of assembly of the receiver plate.

Each of the slanted surfaces 16, 17 is slanted widthwise of the receiver plate 2, from one end toward the other of the width, at a same slanting angle but in the opposite directions to each other. Specifically, with the surface 3 being a datum, the slanted surface 16 located on the left-hand side in the receiver plate 2 is slanted to become higher when coming closer to its lower end and to become lower when coming closer to its upper end as shown if FIG. 6(d). Likewise, the slanted surface 17 located on the right-hand side in the receiver plate 2 is slanted to become higher when coming closer to its upper end and to become lower when coming closer to its lower end as shown in FIG. 6(c), FIG. 7 is an exploded perspective view for describing a state of assembly of the receiver plates 2F, 2M. The fixed-side receiver plate 2F and the moving-side receiver plate 2M are disposed in symmetry with respect to the axis of rotation of the rocker 4. Specifically, the receiver plates 2F, 2M are disposed in such a way that the slanted surface 16F of the receiver plate 2F faces in parallel to the slanted surface 17M of the receiver plate 2M, whereas the slanted surface 17F of the receiver plate 2F faces in parallel to the slanted surface 16M of the receiver plate 2M.

The fixed-side receiver plate 2F is attached to a fixed block 5. The fixed block 5 has a pair of attaching portions 5T, 5T spaced from each other, and has a generally U-shaped horizontal section. The fixed-side receiver plate 2F is attached to a front surface of the attaching portions 5T, 5T by using four bolts 19. More specifically, the side plates 6, 6 are disposed at left and right end portions respectively of the fixed-side receiver plate 2F, and then the bolts 19 are inserted to bolt insertion holes 6H, 6H of the side plates 6, 6 and the bolt insertion holes of the fixed-side receiver plate 2F. Then, the bolts 19 are threaded into the threaded holes 5H. This fastens the fixed- side receiver plate 2F to the fixed block 5 together with the side plates 6, 6.

The fixed block 5 is fixed to the fixed portion, at which time the fixation is made so as to preload the rocker 4. The preloading of the rocker 4 is performed by pressing the rocker 4 (the roller portion 4a) to the receiver plates 2F, 2M. This makes possible to always maintain the roller portion 4a in contact with the receiver plates 2F, 2M even if the roller portion 4a or the fixed portion undergoes elastic deformation. Further, by preloading the rocker 4, the supporting apparatus 1 is given an elastic deformation in advance, and this increases rigidity of the supporting apparatus 1.

An attaching structure of the fixed block 5 will be described specifically. First, a relatively oblong rectangular parallelepiped pusher block 20 is fixed to the fixed portion by using a bolt 21. Next, the fixed block 5 mounted with the fixed-side receiver plate 2F is disposed to flank the pusher block 20 between the pair of attaching portions 5T, 5T. The fixed block 5 is formed with an insertion hole 22 (See FIG. 2.) extending from a back surface (a surface away from the attaching portions 5T, 5T) toward the space between the attaching portions 5T, 5T. The insertion hole 22 is inserted by a preload adjusting screw 23. The preload adjusting screw 23 is threaded into a threaded hole 24 (See FIG. 2.) formed in the pusher block 20. With this arrangement, if the preload adjusting screw 23 is turned deeper into the threaded hole 24, the fixed block 5 moves closer to the rocker 4, increasing the preload. On the contrary, if the preload adjusting screw 23 is turned out, in the direction to be pulled out of the threaded hole 24, the fixed block 5 moves farther from the rocker 4, decreasing the preload. In this way, the preload adjusting screw 23 is adjusted to give the rocker 4 an appropriate preload, and then the fixed block 5 is fixed to the fixed portion by using four bolts 25.

Next, the engagement of the engaging portion 4b of the rocker 4 with the receiver plates 2F, 2M will be described. As has been described above, the rocker 4 is constituted by connecting the roller portion 4a with the engaging portion 4b. Further, the engaging portion 4b includes a pair of cams 8a, 8a having an identical shape with each other, and the cams 8a, 8b are respectively formed with pairs of mutually symmetric engaging surfaces CFa, CMa, CFb, CMb. The pair of cams 8a, 8b are disposed in a mutually inverted relationship. Therefore, the engaging portion 4b has its pair of cams 8a, 8b disposed side by side, on the axis of rotation of the roller portion 4a, with a pair of engaging surfaces CFa, CFb on the fixed side and another pair of engaging surfaces CMa, CMb on the moving side, and in each of the pairs on a same side, the engaging surfaces CFa, CFb, CMa, CMb are in a mutually inverted relationship.

With the arrangement described above, the engaging surface C of the engaging portion 4b maintains contact with the slanted surfaces 16, 17 of the receiver plates 2F, 2M when the roller portion 4a rolls accompanying the reciprocating movement of the moving portion. Specifically, the contact is maintained by forming the engaging surface C as an involute curve created from a pitch circle defined by an outer circumferential surface of the roller portion 4a, so as to keep contacts always with the slanted surfaces 16, 17. Alternatively, the contact is maintained by forming the engaging surface C in such a way that a distance between the centerline of the cam 8 and the flat surface 3 contacted by the roller portion 4a is constant if the cam 8 rolls without slipping while having the engaging surface C always contacting the slanted surfaces 16, 17. However, in this case, it is necessary that the axis of rotation of the roller portion 4a and the centerline of the cam B are on a same straight line.

Figure 8:
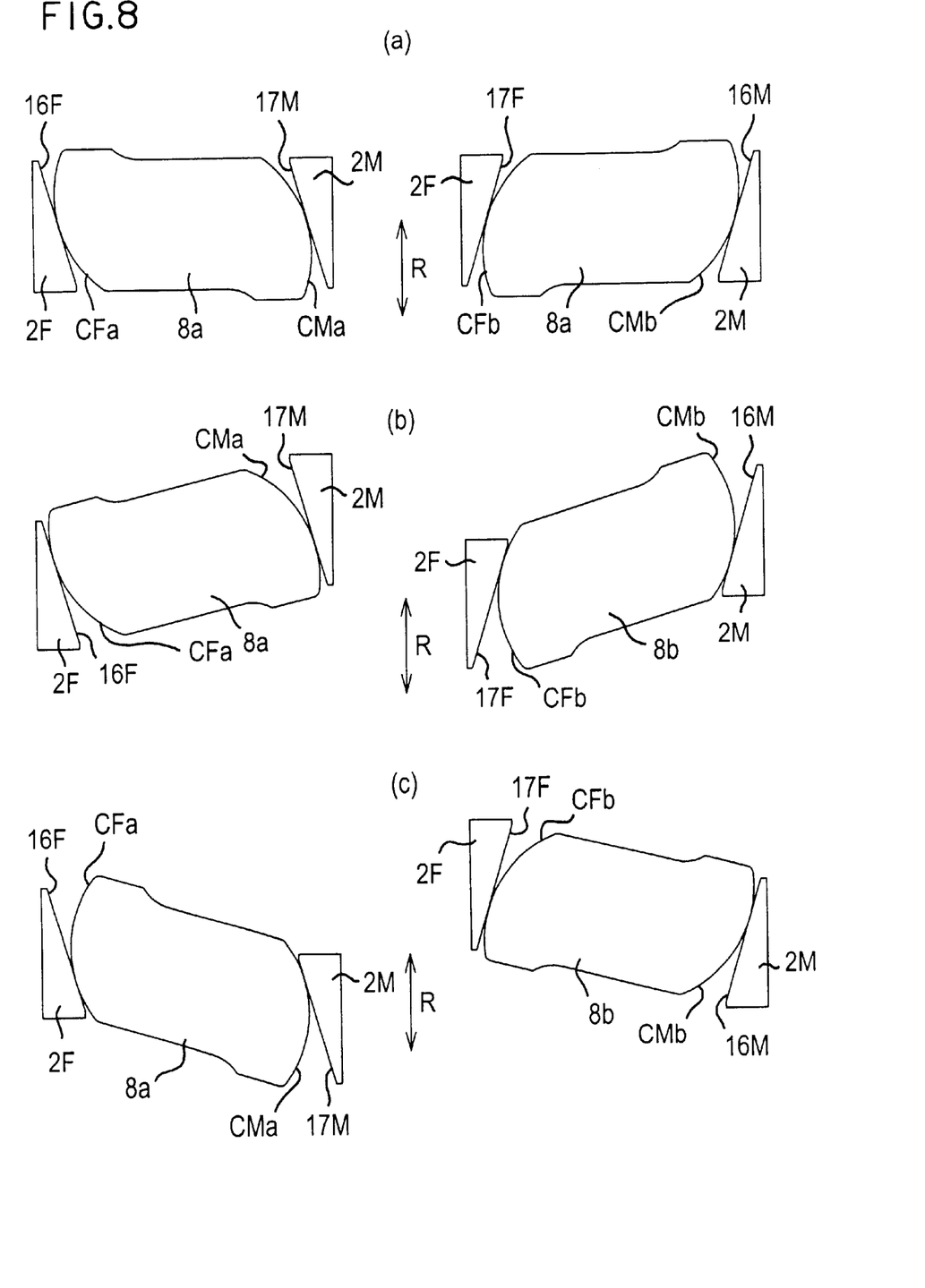
FIG. 8 is a diagram for describing an engagement between slanted surfaces of the receiver plates and engaging surfaces of the cam.

FIG. 8 depicts states of the engagement between the engaging surface C of the engaging portion 4b and the slanted surfaces 16, 17 of the receiver plates 2F, 2M. Herein, description will be made for a case in which the moving portion vibrates in vertical directions. Since the pair of slanted surfaces 16F, 17F of the fixed-side receiver plate 2F have slants slanting in opposite directions to each other, as shown in FIG. 8(a), the slanted surface 16F has its lower portion projecting out of the flat surface 3, whereas the slanted surface 17F has its upper portion projecting out. On the other hand, the pair of slanted surfaces 16M, 17M of the moving-side receiver plate 2M are symmetric to the fixed-side slanted surfaces 16F, 17F with respect to the axis of rotation, and therefore the slanted surface 17M facing the fixed-side slanted surface 16F has its upper portion projecting out, whereas the slanted surface 16M facing the fixed-side slanted surface 17F has its lower portion projecting out.

Therefore, the rocker 4 has its lower portion constrained by the fixed-side slanted surface 16F and the moving-side slanted surface 16M, and has its upper portion constrained by the fixed-side slanted surface 17F and the moving-side slanted surface 17M, thereby being held between the receiver plates 2F, 2M. Further, since the first and the second engaging members 8a, 8b are disposed in the mutually reversed relationship, disengaging directions of the first and the second engaging members 8a, 8b from the receiver plates 2F, 2M are different from each other. With this arrangement, even if the moving portion makes a movement (vibration) with respect to the fixed portion, the rocking member 4 which is simply sandwiched between the pair of receiving members 2F, 2M does not fall off from between the receiving members 2F, 2M, and is held between the pair of receiver plates 2F, 2M (See FIGS. 8(b) and (c)).

As has been described above, according to the present embodiment, since the roller portion 4a which limits the movement of the moving portion in crosswise directions Y (radial directions) has a relatively simple shape, manufacture of the rocker 4 including the roller portion 4a becomes easy, making possible to reduce the cost of manufacture. Further, since the radial movement of the moving portion is limited by the roller portion 4a which has a relatively simple shape, the moving portion can be supported stably. Further, since the roller portion 4a is not susceptible to wear and chipping, it becomes possible to improve durability. Further, since the pair of receiver plates 2F, 2M and the rocker 4 are only in contact with each other, assembling operation of the supporting apparatus 1 becomes easy, and the replacing operation of the rocker 4 also becomes easy.

Further, since the rocker 4 is constituted by an assembly of the individually formed roller portion 4a and engaging portion 4b, shape of the parts to be manufactured is simpler than in the case in which the rocker 4 is formed as an integral part. Therefore, the roller portion 4a and the engaging portion 4b can be manufactured easily, making possible to reduce the cost of manufacture. Further, since the engaging portion 4b is constituted as an assembly of a pair of identically shaped cams 8, shape of the part to be manufactured is simpler than in the case in which the engaging portion 4b is formed as an integral part. In addition, since it is only necessary to manufacture one kind of part, it becomes possible to manufacture the cam easily and to further reduce the cost of manufacture. Still further, since there is only one kind of cam 8, storage and handling of the cam 8 become easy, and the assembling operation becomes simple.

Further, since the pair of receiver plates 2F, 2M are identical in the shape, it is necessary to manufacture only one kind of the receiver plate 2, becoming easy to manufacture the receiver plate 2, and to reduce the cost of manufacture. Still further, since there is only one kind of receiver plate 2, storage and handling of the cam 8 become easy, and the assembling operation becomes simple.

Further, since the side plates 6, 6 limit the movement of the rocker 4 in directions of the axis of rotation, the rocker 4 can be easily held between the pair of receiver plates 2F, 2M, becoming possible to stably support the moving portion. It should be noted here that the side plates 6, 6 may be attached to the moving-side receiver plate 2M or both of the receiver plates 2F, 2M.

As another embodiment, the roller portion 4a and the engaging portion 4b may be connected directly with each other, without the interposition by the elastic member 26. Further, the rocker 4 may be constituted integrally. Still further, it should be noted here that the minimum number of the roller members 10 necessary is one, and the minimum number of the cams 8 necessary is one pair.

Figure 9:
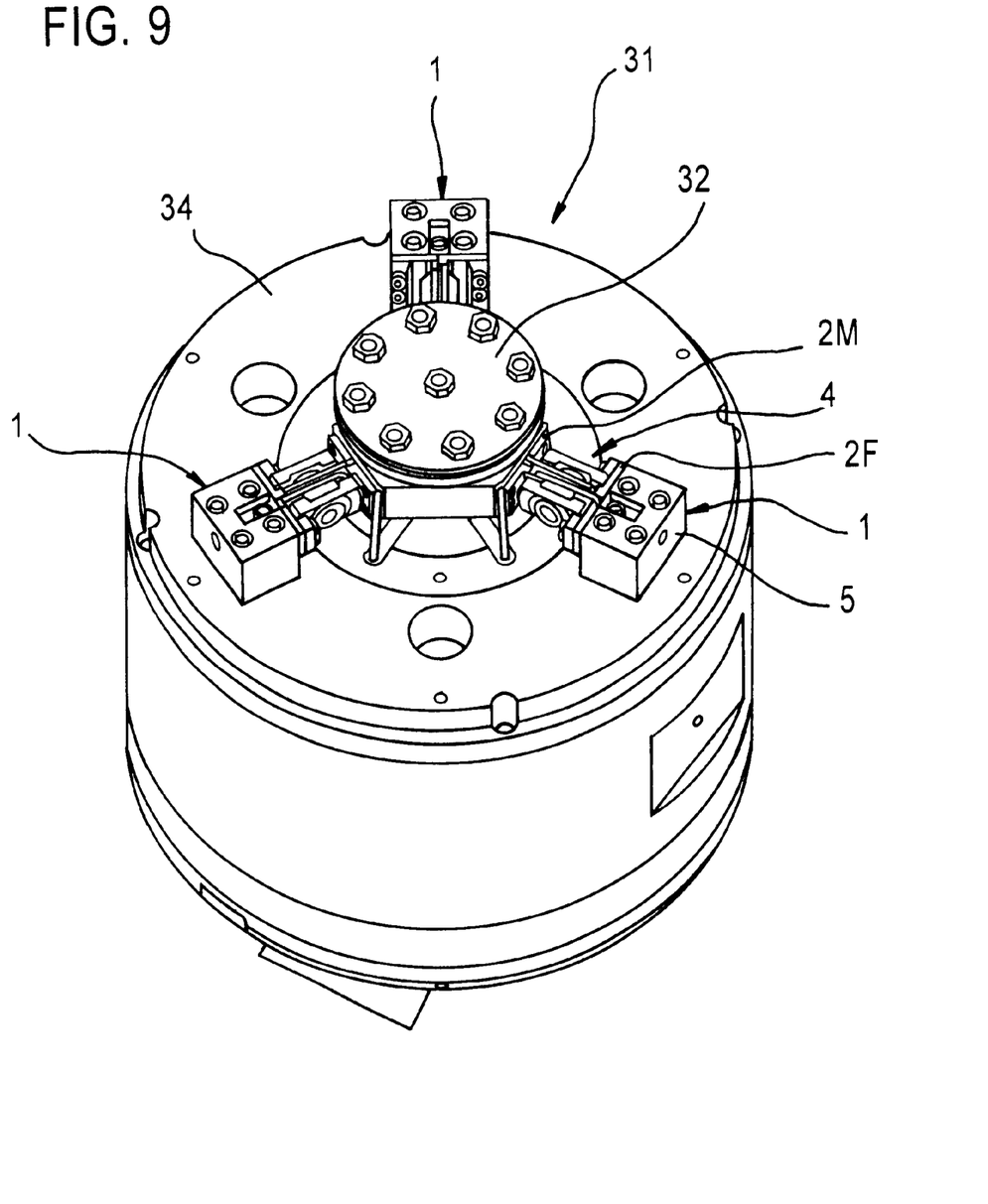
FIG. 9 is a perspective view of a vibration generator.
Figure 10:
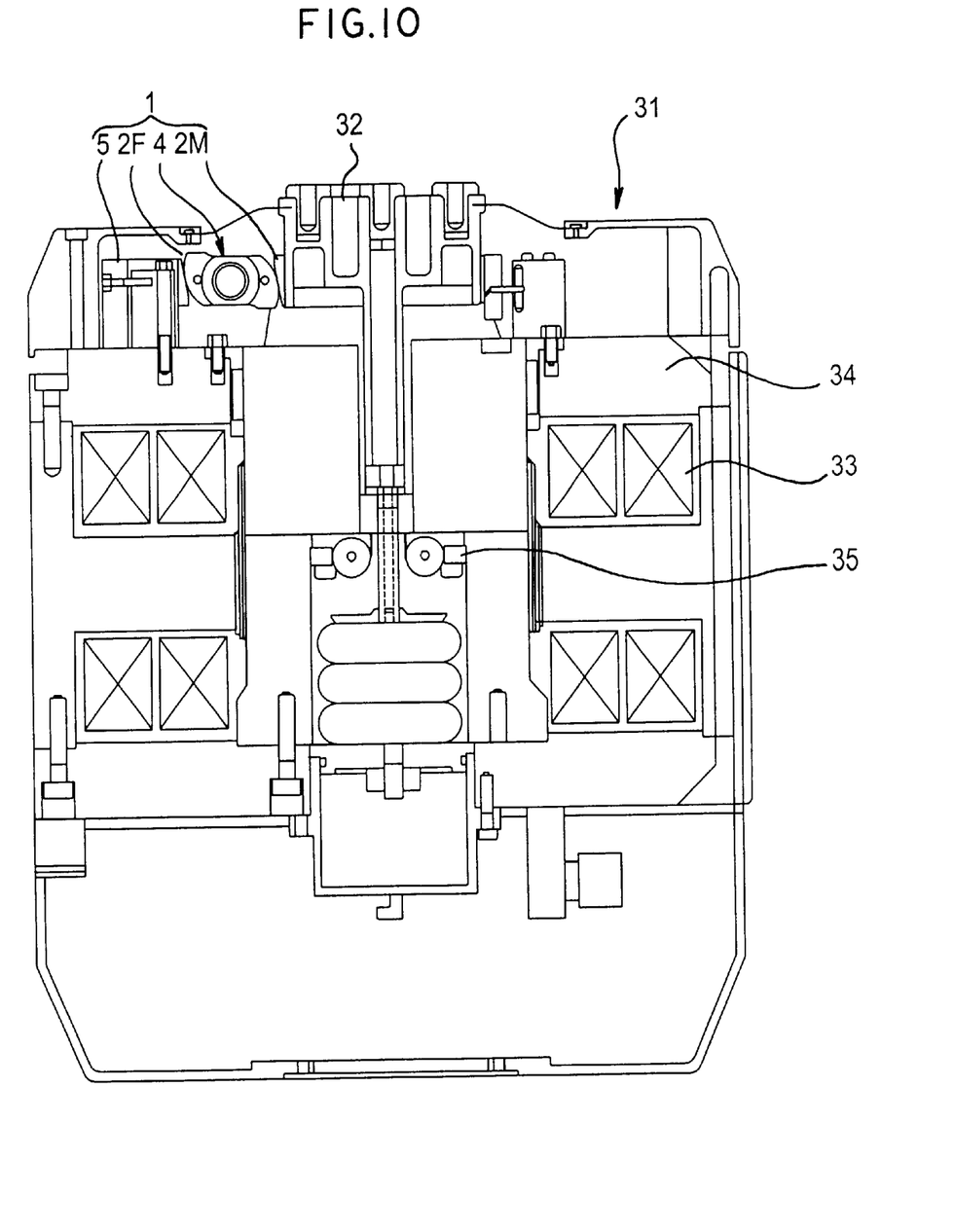
FIG. 10 is a sectional view of the vibration generator.

FIG. 9 is a perspective view of a vibration generator 31 as another embodiment of the present invention. FIG. 10 is a sectional view of the vibration generator 31. The vibration generator 31 comprises a vibrating table (a moving portion) 32 and a main body (fixed portion) 34 including an exciting machine 33 for supplying the vibrating table 32 with vertical vibration along a single axis R. The vibrating table 32 has its lower portion supported by a roller-type supporting apparatus 35 whereas its upper portion supported by the above described supporting apparatuses 1. Specifically, three units of the supporting apparatuses 1 are disposed radially about the vibrating axis R at a 120-degree interval. More specifically, the supporting apparatus 1 is disposed in such a way that the moving-side receiver plate 2M is attached to an outer circumferential portion of the vibrating table 32 which serves as the moving portion, the fixed block 5 mounted with the fixed-side receiver plate 2M is fixed to an upper portion of the main body 34 serving as the fixed portion, and the rocker 4 is sandwiched between the receiver plates 2F, 2M.

According to the above described vibration generator 31, the radial movement can be prevented by the supporting apparatuses 1 and the vibrating table 32 can be stably supported. Therefore, it becomes possible to generate a vibration having a desired vibration waveform, and to improve reliability of the vibration generator.

What is claimed is:

1. A supporting apparatus (1) disposed between a fixed portion and a moving portion facing the fixed portion at a predetermined distance, for supporting the moving portion which vibrates while maintaining parallelism to the fixed portion, characterized in that the moving portion and the fixed portion are respectively provided with receiving members (2M), (2F) facing each other; the receiving members (2M), (2F) sandwiching, under pressure, a rocking member (4) which limits a movement of the moving portion in crosswise directions (Y) vertical to vibrating directions (R) of the moving portion, while rocking about its axis accompanying the vibration of the moving portion in the vibrating directions (R).

2. The supporting apparatus according to claim 1, characterized in that the pair of receiving members (2F) (2M) each has a flat surface (3) parallel to the vibrating directions (R) of the moving portion; the rocking member (4) including a roller portion (4a) and an engaging portion (4b); the roller portion (4a) having an axis of rotation along the crosswise directions (Y); the roller portion (4a) having an outer circumferential surface making linear contact with each flat surface (3) of the receiving members (2F) (2M) In the crosswise directions (Y) upon installation of the rocking member (4); the rocking member (4) being held between the pair of receiving members (2F) (2M) by engagement between the engaging portion (4b) and the pair of receiving members (2F) (2M) during a travel, by rolling, of the roller portion (4a) accompanying a reciprocating movement of the moving portion.

3. The supporting apparatus according to claim 1 or claim 2, characterized in that the engaging portion (4b) Includes a pair of first and second engaging members (8a) (8b) each having arcuate engaging surfaces (C) (C) respectively on a side facing the fixed portion and on a side facing the moving portion, in symmetry with respect to the axis of rotation; the first and the second engaging portions (8a) (8b) being disposed side by side, on the axis of rotation, in a mutually inverted relationship; each of the receiving members (2F) (2M) being provided with a pair of slanted surfaces slanting at a same angle but in opposite directions; the mutually-facing slanted surfaces (16) (17) being slanted in a same direction; each of the first and the second engaging members (8a) (8b) being disposed between the receiving members (2F) (2M), with respective engaging surfaces (C) (C), contacting a corresponding one of the slanted surfaces (16) (17); the engaging surfaces of the engaging portion (4b) and the slanted surfaces of the receiving members (2) keeping contact during the travel, by rolling, of the roller portion (4a) accompanying the reciprocating movement of the moving portion.

4. The supporting apparatus according to claim 2, characterized in that the rocking member (4) is constituted by connecting the roller portion (4a) and the engaging portion 4(b) each formed individually, and that the first and the second engaging portions (8a) (8b) of the engaging portion (4b) are members having a same shape.

5. The supporting apparatus according to claim 1 or claim 2, characterized in that the fixed-side receiving member (2F) and the moving-side receiving member (2M) are members having a same shape, and disposed in symmetry with respect to the axis of rotation of the rocking member (4).

6. The supporting apparatus according to claim 1 or claim 2, characterized in that at least one of the fixed-side receiving member (2F) and the moving-side receiving member (2M) is provided with a limiting member (6) for limiting an axial movement of the rocking member (4).

7. A vibration generator comprising a vibrating table (32) and a main body (34) including an exciting machine (33) for giving the vibrating table (32) a vibration in directions along a predetermined single axis (R), characterized in that the vibrating table (32) provides a moving portion, the main body (34) providing a fixed portion, a plurality of supporting apparatuses (1) according to claim 1 or claim 2 being disposed between the main body (34) and the vibrating table (32) for supporting the vibrating table (32).

* * * * *